US011685815B2

(12) United States Patent
Nagaoka et al.

(10) Patent No.: US 11,685,815 B2
(45) Date of Patent: Jun. 27, 2023

(54) VINYLIDENE-FLUORIDE RESIN FILM

(71) Applicant: DENKA COMPANY LIMITED, Tokyo (JP)

(72) Inventors: Kouta Nagaoka, Isesaki (JP); Tadashi Sawasato, Ichihara (JP); Keiji Takano, Isesaki (JP)

(73) Assignee: DENKA COMPANY LIMITED, Tokyo (JP)

( * ) Notice: Subject to any disclaimer, the term of this patent is extended or adjusted under 35 U.S.C. 154(b) by 237 days.

(21) Appl. No.: 16/618,016

(22) PCT Filed: May 31, 2018

(86) PCT No.: PCT/JP2018/020924
§ 371 (c)(1),
(2) Date: Nov. 27, 2019

(87) PCT Pub. No.: WO2018/221643
PCT Pub. Date: Dec. 6, 2018

(65) Prior Publication Data

US 2020/0140636 A1 May 7, 2020

(30) Foreign Application Priority Data

Jun. 1, 2017 (JP) ................................ 2017-109060

(51) Int. Cl.

| | |
|---|---|
| *B32B 27/08* | (2006.01) |
| *C08J 5/18* | (2006.01) |
| *B32B 27/30* | (2006.01) |
| *C08L 27/16* | (2006.01) |

(52) U.S. Cl.
CPC ................ *C08J 5/18* (2013.01); *B32B 27/08* (2013.01); *B32B 27/30* (2013.01); *B32B 27/304* (2013.01); *C08L 27/16* (2013.01); *B32B 2250/02* (2013.01); *B32B 2250/246* (2013.01); *C08J 2327/16* (2013.01); *C08J 2413/00* (2013.01); *C08J 2427/16* (2013.01); *C08J 2433/12* (2013.01);
(Continued)

(58) Field of Classification Search
CPC ............................ B32B 27/304; B32B 27/308
See application file for complete search history.

(56) References Cited

FOREIGN PATENT DOCUMENTS

| | | | |
|---|---|---|---|
| EP | 1798253 | A1 | 6/2007 |
| EP | 2 530 118 | A1 | 12/2012 |
| EP | 2530118 | A1 | 12/2012 |

(Continued)

OTHER PUBLICATIONS

Machine Translation of JP 2008-012689 (Year: 2008).*

(Continued)

*Primary Examiner* — Zachary M Davis
(74) *Attorney, Agent, or Firm* — Stein IP, LLC

(57) ABSTRACT

To provide a vinylidene-fluoride resin film having low cloudiness and good visibility of a pattern and the like of a decorative film of a lower layer although having a matte tone with low glossiness. The vinylidene-fluoride resin film comprises crosslinked acrylic acid ester resin particles, in which the crosslinked acrylic acid ester resin particles have an average particle diameter of 5% or more and 40% or less to the thickness of the vinylidene-fluoride resin film and the arithmetic average surface roughness (Ra) of the vinylidene-fluoride resin film is 0.4 μm or more and less than 2 μm.

12 Claims, 1 Drawing Sheet

(52) U.S. Cl.
CPC ..... *C08L 2205/025* (2013.01); *C08L 2205/03* (2013.01)

(56) References Cited

FOREIGN PATENT DOCUMENTS

| | | | |
|---|---|---|---|
| EP | 2570452 | A1 | 3/2013 |
| JP | 02-028239 | A | 1/1990 |
| JP | 2001-205755 | A | 7/2001 |
| JP | 2005-139416 | A | 6/2005 |
| JP | 2008-12689 | A | 1/2008 |
| JP | 2009-56770 | A | 3/2009 |
| JP | 5255191 | B2 | 4/2013 |
| JP | 2015-203093 | A | 11/2015 |
| WO | WO 2006/016618 | A1 | 2/2006 |
| WO | WO 2011/093300 | A | 8/2011 |

OTHER PUBLICATIONS

Machine Translation of JP 2009-056770 (Year: 2009).*
International Preliminary Report on Patentability dated Dec. 12, 2019, issued to International Patent Application No. PCT/JP2018/020924.
International Search Report dated Aug. 21, 2018, issued to International Application No. PCT/JP2018/020924.

* cited by examiner

[Fig. 1]
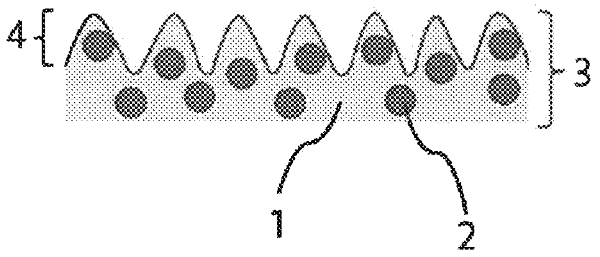
[Fig. 2]
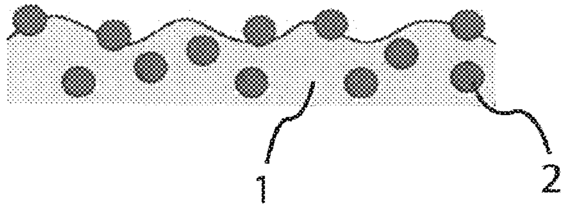
[Fig. 3]
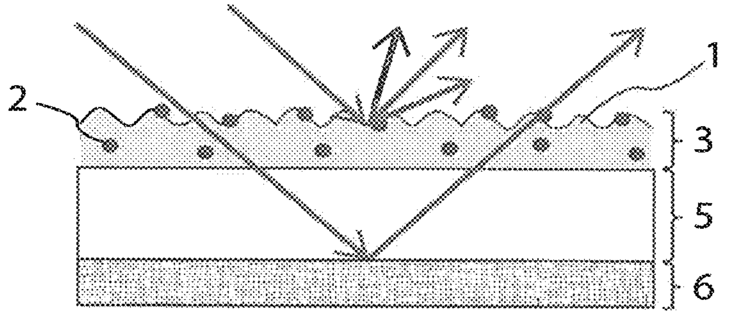

VINYLIDENE-FLUORIDE RESIN FILM

CROSS-REFERENCE TO RELATED APPLICATIONS

This application is a national stage of International Application No. PCT/JP2018/020924, filed May 31, 2018, which claims the benefit of priority to Japanese Application No. 2017-109060, filed Jun. 1, 2017, in the Japanese Patent Office, the disclosures of which are incorporated herein by reference.

TECHNICAL FIELD

The present invention relates to a vinylidene-fluoride resin film.

BACKGROUND ART

In an automobile decoration field, painting or metal plating has been used so far for a long time. In recent years, however, it has started to take an attitude of shifting to film decoration instead of painting or metal plating in order to reduce the body weight or reduce manufacturing line processes.

For example, a body, a panel dashboard, and the like of an automobile are decorated with a decorative film and further covered with a protective layer.

The outermost layer of a conventionally used decorative film protective layer is an acrylic film. However, the acrylic film has some disadvantages. For example, the acrylic film has deteriorated due to a sunscreen cream or an insecticide or the acrylic film has been whitened when the temperature increases in a state where a sunscreen cream or an insecticide adheres thereto in some cases.

Moreover, the decorative film protective layer is stuck to the body, the panel dashboard, and the like having a complicated shape with a large number of irregularities, and therefore has been required to have followability to the irregularities which allows the film to adhere thereto even in a case of the presence of a large number of irregularities.

Furthermore, nonmetallic metal tone decoration has begun to be popular in the exterior and the like of an automobile. The nonmetallic metal tone is a matte tone having low glossiness, also referred to as a frosted tone, and frequently used for luxury automobiles and the like.

For example, a vinylidene-fluoride resin film described in Patent Document 1 has been developed as a film having a frosted tone of automobile members. In the vinylidene-fluoride resin film, the front surface layer comprises a crosslinked acrylic resin and a vinylidene-fluoride resin.

CITATION LIST

Patent Document

[Patent Document 1] JP-A No. 2001-205755

SUMMARY OF THE INVENTION

Technical Problem

However, the vinylidene-fluoride resin film described in Patent Document 1 exhibits a frosted tone when stuck onto a decorative film but a pattern and the like on the decorative film has become cloudy and the color tone has changed, so that the visibility clearly transmitting color or a design of an adherend has not been sufficient.

Thus, the protective film has been demanded to have inconsistent features that, while the protective film has a matte tone with low glossiness, the protective film has low cloudiness and is excellent in the transmittance of visible light and has good visibility of a pattern and the like on the decorative film. Moreover, the protective film has also been demanded to have chemical resistance, weatherability, heat resistance, followability to irregularities, and the like.

Solution to Problem

Thus, the present inventors have extensively conducted examinations in order to solve the above-described problems, and thus has accomplished the present invention.

More specifically, the present invention provides a vinylidene-fluoride resin film comprising crosslinked acrylic acid ester resin particles, in which the crosslinked acrylic acid ester resin particles have an average particle diameter of 5% or more and 40% or less to the thickness of the vinylidene-fluoride resin film and the arithmetic average surface roughness (Ra) of the vinylidene-fluoride resin film is 0.4 μm or more and less than 2 μm.

Herein, the crosslinked acrylic acid ester resin particles are preferably comprised in an amount of 5 parts by mass or more and 25 parts by mass or less based on 100 parts by mass of a vinylidene-fluoride resin.

Moreover, the average particle diameter of the crosslinked acrylic acid ester resin particles is preferably 3.5 μm or more and 7.5 μm or less.

The vinylidene-fluoride resin preferably comprises a copolymer of vinylidene fluoride and hexafluoropropene and/or polyvinylidene fluoride.

The vinylidene-fluoride resin may comprise a methacrylic acid ester resin.

In that case, the vinylidene-fluoride resin preferably comprises 50 parts by mass or more and 99 parts by mass or less of the vinylidene fluoride resin comprising the copolymer of vinylidene fluoride and hexafluoropropene and/or polyvinylidene fluoride and 50 parts by mass or less and 1 part by mass or more of the methacrylic acid ester resin so that the total is 100 parts by mass.

The thickness of the vinylidene-fluoride resin film of the present invention can be set to 5 μm or more and 200 μm or less.

The vinylidene-fluoride resin film of the present invention can be formed into a laminated film in which the vinylidene-fluoride resin film is laminated on a methacrylic acid ester resin film.

The methacrylic acid ester resin may comprise the vinylidene-fluoride resin.

In that case, the methacrylic acid ester resin preferably comprises 50 parts by mass or less and 1 part by mass or more of the vinylidene fluoride resin comprising the copolymer of vinylidene fluoride and hexafluoropropene and/or polyvinylidene fluoride and 50 parts by mass or more and 99 parts by mass or less of the methacrylic acid ester resin so that the total is 100 parts by mass.

It is preferable in the laminated film that the entire thickness of the film is 20 μm or more and 300 μm or less and the ratio of the methacrylic acid ester resin film to the entire thickness of the film is 95% or less.

The laminated film can be laminated on a decorative film.

Furthermore, the present invention can provide an automobile or automobile parts in which the vinylidene-fluoride resin film or the laminated film is bonded to the front surface.

Advantageous Effects of Invention

The present invention can provide a vinylidene-fluoride resin film having low cloudiness and excellent visible light transmittance and having high visibility of a pattern and the like of a decorative film of a lower layer although having a matte tone with low glossiness. Moreover, the present invention can provide a vinylidene-fluoride resin film which also has excellent chemical resistance, weatherability, heat resistance, followability to irregularities, adhesiveness with other base materials, and the like and is excellent also in workability.

BRIEF DESCRIPTION OF DRAWINGS

FIG. 1 is a view illustrating a vinylidene-fluoride resin film of the present invention.

FIG. 2 is a view illustrating the vinylidene-fluoride resin film of the present invention.

FIG. 3 is a view illustrating a laminated film of the present invention.

DESCRIPTION OF EMBODIMENTS

Hereinafter, preferable embodiments for implementing the present invention are described. The embodiments described below describe typical embodiments of the present invention and the scope of the present invention is not narrowly interpreted by the embodiments.

[1. Vinylidene-Fluoride Resin Film of Present Invention]

The vinylidene-fluoride resin film of the present invention comprises crosslinked acrylic acid ester resin particles.

1-1. Vinylidene-Fluoride Resin

First, a vinylidene-fluoride resin serving as a base material of the vinylidene-fluoride resin film preferably has a refractive index close to the refractive index of a crosslinked acrylic acid ester resin compounded as particles described later. The refractive index is preferably 1.3 to 1.5 and more preferably 1.4 to 1.49.

When the refractive index is 1.3 to 1.5, a refractive index difference between the vinylidene-fluoride resin and the crosslinked acrylic acid ester resin does not become excessively large and an increase in the internal haze is suppressed, so that the visibility of a pattern and the like on a film protection target, such as automobile parts, can be satisfactorily maintained.

The vinylidene-fluoride resin having the refractive index described above is not particularly limited. For example, polyvinylidene fluoride and a copolymer of vinylidene fluoride and hexafluoropropene are mentioned. These resins may be used alone or may be used as a mixture as necessary. In particular, the use of the copolymer of vinylidene fluoride and hexafluoropropene improves the followability to irregularities.

The vinylidene-fluoride resin can be used as a mixture with other resins as necessary insofar as the weatherability, chemical resistance, antifouling property, and transparency which are features of the vinylidene-fluoride resin are not impaired and the refractive index described above is maintained.

Suitably usable examples include a mixture of the vinylidene-fluoride resin and a methacrylic acid ester resin. The methacrylic acid ester resin is preferable also from the viewpoint of compatibility.

The mixture ratio of the vinylidene-fluoride resin and the methacrylic acid ester resin is not particularly limited insofar as the internal haze value of the film is not deteriorated.

As a suitable mixture ratio, for example, 50 parts by mass or more and 99 parts by mass or less of a vinylidene-fluoride resin comprising a copolymer of vinylidene-fluoride and hexafluoropropene and/or polyvinylidene fluoride and 50 parts by mass or less and 1 part by mass or more of the methacrylic acid ester resin are mixed so that the total is 100 parts by mass.

When the mixture ratio is set within the mixture ratio range above, a vinylidene-fluoride resin rich film is obtained, so that the chemical resistance, weatherability, heat resistance, followability to irregularities, adhesiveness with other base materials, and the like are improved.

When the vinylidene-fluoride resin is set to 50 parts by mass or more, the antifouling property which is a feature of the vinylidene-fluoride resin is also sufficiently obtained.

When the methacrylic acid ester resin is set to 50 parts by mass or less, the strength of the film can be maintained, so that a fracture when tension is applied in processing, such as lamination, can also be prevented.

Examples of the methacrylic acid ester resin include polymethyl methacrylate, a copolymer of methyl methacrylate and acrylic acid n-butyl, a copolymer with other monomers, acrylic acid n-butyl rubber reinforced methyl methacrylate, and the like. These substances may be used alone or may be used as a mixture of a plurality of kinds thereof as necessary.

The methacrylic acid ester resin is not particularly limited in the type and the amount insofar as the transparency when mixed with the vinylidene-fluoride resin is not impaired.

To the vinylidene-fluoride resin film of the present invention, heat stabilizers can be added as necessary besides the methacrylic acid ester resin. Examples of the heat stabilizers include a phenolic antioxidant, a phosphorus-based antioxidant, a sulfur-based antioxidant, an epoxy compound, β-diketone, and the like. Among the above, the phenolic antioxidant and the phosphorus-based antioxidant do not hinder the transparency, and thus are preferable.

As a method for adding the heat stabilizer, a method including using one obtained by melt-mixing the heat stabilizer with the vinylidene-fluoride resin and/or the methacrylic acid ester resin for granulation beforehand as a raw material may be acceptable or a method including melt-mixing the heat stabilizer with the vinylidene-fluoride resin and/or the methacrylic acid ester resin when manufacturing a film, and then performing film formation in the same flow may also be acceptable.

The addition amount of the heat stabilizer is, although not particularly limited, preferably 0.001 to 5% by mass and more preferably 0.1 to 1.0% by mass.

When the addition amount of the heat stabilizer is 0.001% by mass or more, sufficient heat stability is obtained. When the addition amount of the heat stabilizer is 5% by mass or less, a deterioration of the transparency of the vinylidene-fluoride resin film or the visibility and the color tone of a decorative film (base) can be suppressed.

Furthermore, ultraviolet absorbers can be added to the vinylidene-fluoride resin film as necessary. Examples of the ultraviolet absorbers include organic ultraviolet absorbers, such as benzotriazole-based ultraviolet absorbers, benzophenone-based ultraviolet absorbers, and triazine-based ultraviolet absorbers.

In particular, the triazine-based ultraviolet absorbers are preferable and 2-(4,6-diphenyl-1,3,5-triazine-2-yl)-5-[2-(2-ethylhexanoyloxy)ethoxy]phenol is preferable in the respect of the compatibility with the vinylidene-fluoride resin.

As a method for adding the ultraviolet absorber, a method including using one obtained by melt-mixing the ultraviolet absorber with the vinylidene-fluoride resin and/or the methacrylic acid ester resin for granulation beforehand as a raw material may be acceptable or a method including melt-mixing the ultraviolet absorber with the vinylidene-fluoride resin and/or the methacrylic acid ester resin when manufacturing a film, and then performing film formation in the same flow may be acceptable.

The addition amount of the ultraviolet absorber is, although not particularly limited, preferably 0.001 to 10% by mass and more preferably 0.1 to 5% by mass.

When the addition amount of the ultraviolet absorber is 0.001% by mass or more, sufficient ultraviolet ray cutting performance is obtained, so that an adherend of the vinylidene-fluoride resin film of the present invention can be protected from a deterioration due to ultraviolet rays. When the addition amount of the ultraviolet absorber is 10% by mass or less, a deterioration of the transparency of the vinylidene-fluoride resin film or the visibility and the color tone of a decorative film (base) can be suppressed.

In addition thereto, a plasticizer, a lubricant, an antistatic agent, an antifogging agent, an antisticking agent, a hydrophilic agent, a liquid repellent agent, and the like can be added insofar as the glossiness is low, transparency and heat resistance are imparted, and the film appearance and the like are not practically impaired. Although pigments can also be added, a white tone is exhibited in some cases in the case of a titanium-based pigment and the like. Therefore, pigments are not required to be added.

As an addition method, the substances above may be applied to the front surface after manufacturing a film besides the method including adding the substances above in melt-mixing in the same manner as described above.

As described above, the composition of the vinylidene-fluoride resin film as a base material comprising the crosslinked acrylic acid ester resin particles is configured.

1-2. Crosslinked Acrylic Acid Ester-Based Resin Particles

The crosslinked acrylic acid ester resin particles to be used for the vinylidene-fluoride resin film of the present invention comprise acrylic acid esters, such as methyl methacrylate and methacrylic acid n-butyl, for example, as a raw material.

Although a crosslinking agent is not particularly limited, an epoxy-based crosslinking agent, an isocyanate-based crosslinking agent, and the like are usable as a common crosslinking agent.

As the particle diameter of the crosslinked acrylic acid ester resin particles, the crosslinked acrylic acid ester resin particles have an average particle diameter of 5% to 40% to the thickness of the vinylidene-fluoride resin film of the present invention and the average particle diameter is preferably 10% to 35%.

For example, when the thickness of the vinylidene-fluoride resin film is 5 μm to 200 μm, the average particle diameters is 0.25 μm to 80 μm.

When the average particle diameter is less than 0.25 μm, the internal haze of the film becomes excessively high due to an increase in light scattering efficiency due to the fact that the number of the particles is large as compared with a film to which the same parts by mass of particles having a larger average particle diameter are added, and thus the average particle diameter is not preferable.

When the average particle diameter exceeds 80 μm, irregularities of the front surface of the film decrease due to the fact that the number of the particles is small as compared with a film to which the same parts by mass of particles having a smaller average particle diameter are added, so that the light scattering efficiency is lowered. As a result, the external haze becomes excessively low, the glossiness of the front surface of the film increases, and a matte feeling is hard to be obtained, and thus the average particle diameter is not preferable.

When the vinylidene-fluoride resin film of the present invention is used as a surface protective film of a body and parts of an automobile, the average particle diameter of the crosslinked acrylic acid ester resin particles is preferably 3.5 μm to 7.5 μm and more preferably 3.5 μm to 4.5 μm.

In usual, it is considered that, when the average particle diameter is small, the surface glossiness increases and a frosted surface is not obtained. However, one having a relatively small average particle diameter, which seems to be difficult to obtain a frosted surface, was used in the present invention. Thus, a film achieving both effects that the cloudiness is low and excellent visible light transmittance is imparted and the visibility of a pattern and the like of a decorative film of a lower layer is high although having a frosted feeling and a matte feeling was unexpectedly obtained.

However, when the average particle diameter is excessively small, the internal haze of the film increases, so that a white tone is exhibited, and thus the average particle diameter is not preferable.

With respect to the crosslinked acrylic acid ester resin particles, particles having the same average particle diameter may be comprised in the vinylidene-fluoride resin film or particles having a different average particle diameter may be mixed and comprised in the vinylidene-fluoride resin film.

1-3. Vinylidene-Fluoride Resin Film Comprising Crosslinked Acrylic Acid Ester-Based Resin Particles The crosslinked acrylic acid ester-based resin particles are preferably comprised in the vinylidene fluoride resin in an amount of 5 parts by mass to 25 parts by mass based on 100 parts by mass of the vinylidene fluoride resin. When the amount is 25 parts by mass or less, the internal haze does not become excessively high and the visibility of a protection target can be maintained. When the amount is 5 parts by mass or more, the external haze does not become excessively low and an increase in glossiness is suppressed, and therefore the matte feeling of the front surface of the film can be maintained.

In particular, when used for a vinylidene-fluoride resin film for a body or parts of an automobile, the content of the crosslinked acrylic acid ester resin particles is preferably 8 to 12 parts by mass based on 100 parts by mass of the vinylidene-fluoride resin but the content is not limited thereto.

FIG. 1 illustrates an embodiment of the vinylidene-fluoride resin film of the present invention.

In a vinylidene-fluoride resin 1, crosslinked acrylic acid ester resin particles 2 are comprised in such a manner as to be dispersed, so that a vinylidene-fluoride resin film 3 is formed. A matte tone front surface 4 of the vinylidene-fluoride resin film 3 is formed and maintained originating from the presence of the crosslinked acrylic acid ester resin particles 2.

Herein, the arithmetic average surface roughness (Ra) of the matte tone front surface 4 of FIG. 1 is 0.4 μm or more and less than 2 μm. When the arithmetic average surface roughness (Ra) is within this numerical range, suitable cloudiness and matte feeling and the transparency and visibility are balanced.

When the arithmetic average surface roughness (Ra) is less than 0.4 μm, the cloudiness of the film decreases, so that gloss appears. When the arithmetic average surface roughness (Ra) is 2 μm or more, the cloudiness of the film increases, an impression coarser than the matte tone is presented, and the transparency and the visibility also decrease.

The thickness 3 of the vinylidene-fluoride resin film of the present invention is not particularly limited and can be set to a thickness of 5 μm to 200 μm, for example, according to the intended use of the film. When the thickness is excessively small, the front surface is coarse, the appearance is rough, and a hole is easily formed.

The thickness of the vinylidene-fluoride resin film includes the degree of the arithmetic average surface roughness (Ra) of the vinylidene-fluoride resin film.

1-4. Method for Manufacturing Vinylidene-Fluoride Resin Film

As a method for manufacturing the vinylidene-fluoride resin film of the present invention, a conventional technique may be applied and the method is not particularly limited. An example of the manufacturing method is described below.

Raw materials to be used for the vinylidene-fluoride resin film are uniformly melt-mixed beforehand, and then used for film formation.

An extruder used for performing the melt-mixing beforehand is not particularly limited insofar as the extruder has a screw length and a screw configuration enough to sufficiently melt and uniformly disperse resin raw materials. As an example of an extruder capable of performing the uniform melt-mixing, a twin screw extruder of a screw configuration having a sufficient kneading function, such as neutral screw kneading and backward screw kneading besides forward screw kneading, can be mentioned.

The vinylidene-fluoride resin film can be manufactured by any method of a solvent cast method and an extrusion molding method. In the respect of improving the manufacturing efficiency, the application of the extrusion molding method is preferable.

Examples of facilities to be used for the extrusion molding include a facility provided with a T-die on the downstream side of a single screw type extruder or a twin screw extruder.

When a fluororesin is continuously heated more than necessary, there is a risk of the generation of harmful gas due to the decomposition of the resin. Therefore, in order to prevent the generation of excessive shearing heat and reduce places where the shearing heat stays, the single screw extruder is more preferable.

As a preferable specification of a screw to be used for the extruder, a ratio (L/D) of the screw length (L [mm]) to the screw diameter (D [mm]) is preferably 20 to 40. When the L/D is less than 20, plasticization and melting of a resin to be used for the raw materials become insufficient, so that the appearance becomes poor and the transparency is likely to deteriorate due to the mixing of unmelted substances into the film in some cases. When the L/D exceeds 40, excessive shearing is likely to be applied besides the fact that the heating time is excessively long, and therefore the resin is likely to deteriorate, which leads to a poor appearance due to yellowing or the generation of foreign substances originating from a deteriorated substance in some cases.

A preferable screw compression ratio is preferably 1.5 to 4.0 and more preferably 2.0 to 3.5. When the compression ratio is less than 1.5, the generation of shearing heat due to the compression of a space between a barrel and a screw groove is insufficient. As a result, the plasticization and the melting of the resin to be used for the raw material are insufficient, so that, besides the fact that the appearance becomes poor and the transparency is likely to deteriorate due to the mixing of unmelted substances into the film, the extrusion amount is not stabilized and the film thickness is not stabilized in some cases. When the compression ratio exceeds 4.0, the shearing heat is excessively generated, and therefore the resin is likely to deteriorate, which leads to a poor appearance due to yellowing or the generation of foreign substances originating from a deteriorated substance in some cases.

The configuration of the screw is not particularly limited insofar as the screw has a specification such that sufficient shearing required to plasticize and melt the resin can be applied. Examples of common screws include screws provided with a kneading zone having a Dulmage, Unimelt, or Maddock type mixing function to a full flight screw, a barrier flight screw, and the like.

On the downstream side of the screw described above, a screen mesh is installed in such a manner as to be fixed to a breaker plate. With respect to the screen mesh, it is preferable to combine two or more screen meshes different in the opening. On the upstream side, a coarse mesh is installed in order to filter coarse foreign substances and a fine mesh is installed on the downstream side thereof. Furthermore, a coarse mesh is installed on the downstream side thereof to prevent the mesh from being fractured by resin pressure. The opening of the finest mesh is set as appropriate based on a permissible range of foreign substances to be mixed into the film according to the purpose and the intended use of the vinylidene-fluoride resin film of the present invention. The opening is preferably less than 0.1 mm and more preferably less than 0.05 mm.

In the facilities described above, the vinylidene-fluoride resin film of the present invention can be manufactured.

1-5. Evaluation of Vinylidene-Fluoride Resin Film

The manufactured vinylidene-fluoride resin film of the present invention can be evaluated for the following items.

Arithmetic Average Surface Roughness (Ra)

The arithmetic average surface roughness (Ra) of the vinylidene-fluoride resin film of the present invention can be measured with a common laser microscope.

As described above, the arithmetic average surface roughness (Ra) of the vinylidene-fluoride resin film of the present invention is 0.4 μm or more and less than 2 μm.

Total Light Transmittance

The total light transmittance of the vinylidene-fluoride resin film of the present invention is evaluated according to JIS K7361-1.

A measured value to the incident light from the matte tone front surface side is preferably 90% or more and more preferably 91% or more. When the measured value is less than 90%, the visibility and the clearness of a design of a decorative film (base) laminated with the vinylidene-fluoride resin film tend to decrease.

Total Haze

The total haze of the vinylidene-fluoride resin film of the present invention is evaluated according to JIS K7136.

A measured value to the incident light from the matte tone front surface side is preferably 60% or more and more preferably 70% or more. When the measured value is less than 60%, a frosted feeling and a matte feeling of the front surface of the film tend to decrease.

Internal Haze

The internal haze accounting for the total haze can be obtained by filling irregularities of the matte tone front surface of the film with a liquid paraffin, silicone oil, and the like, sandwiching the same with cover glasses, and then measuring the same in a state where air bubbles do not enter.

The internal haze is preferably less than 55% and more preferably less than 45%. When the internal haze exceeds 55%, the visibility and the clearness of a design of a decorative film (base) tend to decrease.

External Haze

The external haze accounting for the total haze can be obtained from a difference between a total haze value and an internal haze value.

The external haze is preferably 30% or more and more preferably 50% or more. When an external haze value is less than 30%, a frosted feeling and a matte feeling of the vinylidene-fluoride resin film front surface tend to decrease.

Glossiness

The glossiness of the vinylidene-fluoride resin film of the present invention is evaluated according to JIS Z8741. The glossiness is measured as the glossiness at the incident angle of a light beam of 60°.

The glossiness is preferably less than 15 and more preferably less than 12. When the glossiness becomes 15 or more, a frosted feeling and a matte feeling of the vinylidene-fluoride resin film front surface tend to decrease.

[2. Laminated Film of Present Invention]

2-1. Composition of Back Surface Layer

Although the vinylidene-fluoride resin film may be used alone, the vinylidene-fluoride resin film may be formed into a laminate by bonding with other base materials. The lamination is particularly effective for a case where the content of the vinylidene-fluoride resin is excessively high, and therefore sufficient adhesiveness is not obtained depending on the quality of other base materials.

For example, a back surface layer is provided on the side which is not a matte tone of the vinylidene-fluoride resin film in order to increase the adhesiveness with other base materials.

Examples of the back surface layer include a methacrylic acid ester resin film, for example. Although the back surface layer film may be formed only of a methacrylic acid ester resin, a vinylidene-fluoride resin may be comprised in the methacrylic acid ester resin.

Examples of the vinylidene-fluoride resin include a copolymer of vinylidene fluoride and hexafluoropropene and/or polyvinylidene fluoride, for example.

When the vinylidene fluoride-hexafluoro propene copolymer is selected and used for either the front surface layer or the back surface layer described above or both the front surface layer and the back surface layer described above, the flexibility of the laminated film can be improved, so that the laminated film can be suitably stuck also to an adherend having a complicated shape.

The content of the vinylidene-fluoride resin of the back surface layer is not particularly limited. For example, 50 parts by mass or less and 1 part by mass or more of the vinylidene fluoride resin and 50 parts by mass or more and 99 parts by mass or less of the methacrylic acid ester resin are comprised so that the total is 100 parts by mass, and thus a methacrylic acid ester resin rich film can be formed.

When the content of the methacrylic acid ester resin is 50% by mass or more, sufficient adhesiveness with other base materials of a decorative film (base) is obtained. When used as a surface protective film of the decorative film, a defective phenomenon due to peeling between the decorative film and the back surface layer is hard to occur.

To the back surface layer, the heat stabilizer, the ultraviolet absorber, the plasticizer, the lubricant, the antistatic agent, the antifogging agent, the antisticking agent, the hydrophilic agent, the liquid repellent agent, and the like described above can also be added as necessary besides the vinylidene-fluoride resin. Although pigments can also be added, a white tone is exhibited in some cases in the case of a titanium-based pigment and the like. Therefore, pigments are not required to be added.

As an addition method, the substances above may be applied to the front surface after manufacturing the film besides the method including adding the substances above in melt-mixing of the resin as with the vinylidene-fluoride resin film described above.

The heat stabilizer, the ultraviolet absorber, the plasticizer, the lubricant, the antistatic agent, the antifogging agent, the antisticking agent, the hydrophilic agent, the liquid repellent agent, and the like may be added to either the front surface layer or the back surface layer or both the front surface layer and the back surface layer.

When added only to the back surface layer, the occurrence of a poor appearance accompanying the shift of the additives to the front surface of the film can be prevented, and therefore it is particularly preferable.

The entire thickness of the laminated film is not particularly limited insofar as the quality demanded in the environment where the laminated film is used is realized and is preferably 20 μm to 300 μm and more preferably 30 μm to 80 μm.

When the entire thickness is 20 μm or more, the vinylidene-fluoride resin film of the front surface layer in the planar direction cannot be easily broken, so that the continuity of the vinylidene-fluoride resin layer can be maintained. When the entire thickness is 300 μm or less, the rigidity of the laminated film does not become excessively high, so that the shape followability to a die is not impaired when heat-molded into a three-dimensional shape. Also when stuck to a part which was heat-molded beforehand through an adhesive layer, the followability to irregularities to a complicated-shaped is not impaired.

The thickness of the back surface layer is also not particularly limited and is preferably 95% or less and more preferably 90% or less to the entire thickness of the laminated film, for example.

When the thickness is 95% or less, the front surface layer of the vinylidene-fluoride resin film does not become excessively thin and the generation of a pinhole can be suppressed.

The thickness of the front surface layer is preferably 5 μm to 200 μm. The thickness of the front surface layer is preferably set to be not excessively smaller than the particle diameter of the crosslinked acrylic acid ester resin particles so as not to cause a lack of the continuity in the planar direction of the front surface layer and so as not to degrade the characteristics of the fluororesin, such as chemical resistance and antifouling property.

2-2. Method for Manufacturing Laminated Film

When manufacturing the laminated film of the front surface layer (vinylidene-fluoride resin rich film) and the back surface layer (methacrylic acid ester resin rich film), the laminated film can be manufactured by a method including plasticizing and melting the above-described raw materials of the front surface layer and separately plasticizing and melting raw materials of the back surface layer, joining and laminating the front surface layer and the back surface layer using an extruder for manufacturing the front surface layer (extruder A) and an extruder for manufacturing the back surface layer (extruder B) in a feed block arranged on the upstream side of a T-die (i.e., downstream side of the extruder), and then widening and extruding the resultant substance with the T-die.

As another lamination method, a multi-manifold die method is mentioned and is a method including widening a resin of each layer to a predetermined width in a T-die, and then joining and extruding the layers. The method is suitably usable also in the manufacturing of the laminated film of the present invention.

The melted resin extruded in accordance with the method described above is extruded into a film shape from the T-die, and then adjusted to a predetermined thickness based on a difference between the speed of the resin in a T-die outlet portion and the take-up speed by a take-up roll. Thereafter, the resin is cooled by contacting a temperature-regulated cooling roll to be adjusted to a predetermined thickness.

Furthermore, by performing the taking-up while pressing the take-up roll, the surface of which was embossed, against the front surface of the front surface layer in a softened state in the process described above, an embossed front surface may be obtained.

In the case of the vinylidene-fluoride resin film of the present invention, the film thickness is small, and therefore it is preferable to use a take-up roll in which a specular metal roll and a rubber roll to which an embossed front surface was imparted were press-bonded to each other. Examples of materials which can be suitably used as materials of the metal roll include a hard chrome plated roll and the like. Examples of materials which can be suitably used as materials of the rubber roll include a roll in which sand is dispersed in a silicone rubber, so that an embossed surface is formed and the like.

Although the count of an embossed surface formation roll is not particularly limited and a roll containing sand having a grain size of #320 to #800 is suitably used.

The cooling temperature of the take-up roll is not particularly limited insofar as the emboss transferability to the front surface of the front surface layer is sufficiently obtained and deformation and the like do not occur after film manufacturing. For example, the temperature of the cooling water circulated in the roll is preferably less than 60° C. and more preferably less than 50° C. When the cooling temperature is 60° C. or more, a deterioration of the film appearance occurs in some cases.

The film cooled as described above was adjusted to an arbitrary film width by slitting a film end portion, and then wound with moderate tension not causing tight winding or winding deviation of the film, so that the laminated film of the present invention is obtained.

[3. Automobile or Automobile Parts]

The vinylidene-fluoride resin film or the laminated film of the present invention can be suitably used as a surface protective film in the car interior and exterior use, for example.

Examples of specific adherends of a car interior and exterior surface protective film include various interior members, such as an installment panel, a dashboard, and a door, and various exterior members, such as a body, a front bumper, and a rear bumper.

The surface protective film is used while being laminated with a decorative film to which a design, such as printing or coloring, was given in some cases. Examples of methods for laminating the surface protective film and the decorative film include a method including performing lamination with an adhesive besides a method including performing heat lamination by a Roll-to-Roll method.

As a method for laminating the film in which the surface protective film is laminated on the decorative film and an interior base material part, a three-dimensional surface decoration method is suitably used and a TOM (Three dimension Overlay Method) molding method is typically mentioned. This method is a method including applying various adhesives to the side of a sticking surface with the interior base material part in the film in which the surface protective film is laminated on the decorative film, softening the film by heat, and then performing lamination utilizing an atmospheric pressure difference between the base material part side and a non-base material part side. Examples of the adhesives include an acrylic pressure-sensitive adhesive, a hot melt adhesive, and the like but are not particularly limited thereto.

In the lamination method, the three-dimensional surface decoration method, and the like, even when heat and pressure are applied to the surface protective film, the frosted feeling and the matte feeling are maintained due to irregularities formed by the crosslinked acrylic acid ester resin particles present near the front surface of the front surface layer.

For example, even in the case of the embossed surface protective film, although the embossed surface itself can be somewhat flattened even after the lamination to an adherend and a three-dimensional surface decoration method (FIG. 2), the glossiness is kept low due to the irregularities formed by the crosslinked acrylic acid ester resin particles 2 in the vinylidene-fluoride resin 1.

As for the performance of the surface protective film, it is direct and preferable to confirm and evaluate the appearance as a laminated molded article with other base materials. However, the internal haze, the external haze, the glossiness, and the like may be used as substitute physical properties in accordance with the film evaluation method described above. It is preferable that evaluation values are within the numerical values described above.

For example, as illustrated in FIG. 3, a back surface layer 5 and a front surface layer 3 are laminated on the decorative film 6, and, when light is emitted (arrows), transmitted light, which does not hit the crosslinked acrylic acid ester resin particle 2, passes through the front surface layer (vinylidene-fluoride resin rich film), also passes through the back surface layer (methacrylic acid ester resin rich film), and then is reflected on the decorative film 6.

On the other hand, when light hits the crosslinked acrylic acid ester resin particle, it is considered that the light is diffused there, so that a matte feeling arises.

The lamination and the three-dimensional surface decoration method are preferably performed with light pressure and heating which are sufficient for the adhesion to an adherend but are not excessively strong.

EXAMPLES

Hereinafter, the present invention is described in more detail based on Examples. Examples described below illustrate examples of typical Examples of the present invention and the scope of the present invention is not narrowly interpreted by Examples.

<Used Raw Materials>

Raw materials used in Examples and Comparative Examples are described below. When two or more kinds of the raw materials are mixed to be used, the raw materials were premixed in an unmelted state, and then melted in a melt-mixing facility to be uniformly mixed. Thereafter, the mixture was extruded into a strand shape, cooled, and then cut into pellets. The resultant substances were used as raw materials.

(Vinylidene-Fluoride Resin)

Manufactured by Arkema S.A., Polyvinylidene fluoride Kynar “K720”

Manufactured by Arkema S.A., Polyvinylidene fluoride Kynar “1000HD”

Manufactured by Arkema S.A., Vinylidene fluoride-hexafluoropropylene copolymer Kynarflex “2800-20”

(Methacrylic Acid Ester Resin)

Manufactured by Sumitomo Chemical Co., Ltd., Polymethyl methacrylate (PMMA) SUMIPEX “MGSS”

Manufactured by Mitsubishi Rayon Co., Ltd., Acrylic acid n-butyl rubber reinforced polymethyl methacrylate (* comprising less than 7% of triazine-based ultraviolet absorber) “HBZ G60”

Manufactured by Mitsubishi Rayon Co., Ltd., Acrylic acid n-butyl rubber reinforced polymethyl methacrylate “HBS000”

(Crosslinked Acrylic Acid Ester Resin Particles)

Manufactured by Aica Kogyo Co., Ltd., Crosslinked PMMA particles GANZPEARL “GM-0449S-2”, Average particle diameter D50: 4 μm, Refractive index: 1.49

Manufactured by Aica Kogyo Co., Ltd., Crosslinked PMMA particles GANZPEARL “GM-0630 H”, Average particle diameter D50: 6 μm, Refractive index: 1.49

Manufactured by Aica Kogyo Co., Ltd., Crosslinked PMMA particles GANZPEARL “GM-0806S”, Average particle diameter D50: 8 μm, Refractive index: 1.49

Manufactured by Aica Kogyo Co., Ltd., Crosslinked PMMA particles GANZPEARL “GM-1001”, Average particle diameter D50: 10 μm, Refractive index: 1.49

Manufactured by Aica Kogyo Co., Ltd., Crosslinked polymethacrylic acid butyl particles GANZPEARL “GB-085”, Average particle diameter D50: 8 μm, Refractive index: 1.50

Manufactured by Aica Kogyo Co., Ltd., Crosslinked polymethacrylic acid butyl particles (core shell type) GANZPEARL “GBM-55 S-F”, Average particle diameter D50: 8 μm, Refractive index: 1.50

Manufactured by Aica Kogyo Co., Ltd., Crosslinked PMMA particles GANZPEARL “GM-0105”, Average particle diameter D50: 2 μm, Refractive index: 1.49

Manufactured by Aica Kogyo Co., Ltd., Crosslinked PMMA particles GANZPEARL “GM-0205S”, Average particle diameter D50: 3 μm, Refractive index: 1.49

Manufactured by Aica Kogyo Co., Ltd., Silicone particles GANZPEARL “Si-045”, Average particle diameter D50: 4.5 μm, Refractive index: 1.41

(Ultraviolet Absorber)

Manufactured by BASF A.G., Tinuvin 1577ED

Manufactured by BASF A.G., Tinuvin 234

<Melt-Mixing Facility>

Facilities used for the melt-mixing are as follows.

Manufactured by Kobe Steel, Ltd., “KTX30” Twin-screw extruder (Screw length (L [mm])/Screw diameter (D [mm])=46.8)

Screw kneading unit configuration A VCMT kneading unit and a kneading unit are provided in C5 to C8 process units in a cylinder.

Screen mesh One in which three meshes of a mesh having an opening of 0.25 mm, a mesh having an opening of 0.075 mm, and a mesh having an opening of 0.25 mm were laminated from the screw side was used.

<Film Formation Facility>

The raw materials obtained by the method described above were sufficiently melted with the following extruders, widened inside a coathanger T-die, and then extruded into a film shape. With respect to one having a multilayer configuration, resins of the extruders were laminated in a feed block, widened inside a coathanger T-die, and then extruded into a film shape. The film-shaped resin was obtained by being cooled, immediately after discharged downward, while being taken-up in a state of being sandwiched between a temperature-regulated hard chrome plated roll (Arithmetic average surface roughness Ra=0.2 μm) and an embossed rubber roll comprising sand (#600).

<Extruder a (Front Surface Layer Side in Monolayer Configuration and Multilayer Configuration)>

Manufactured by TANABE PLASTICS MACHINERY CO., LTD., Single screw extruder (L/D=25)

Screw type: Full flight screw

<Extruder B (Back Surface Layer Side in Multilayer Configuration)>

Manufactured by PLABOR Research Laboratory of Plastics Technology Co., Ltd., Single screw extruder (L/D=25)

Screw type: Full flight screw

<T-Die>

Manufactured by SUN ENGINEERING Co., Ltd., Coathanger system, Width: 550 mm, Lip opening degree: 0.5 mm

Example 1

In Example 1, a vinylidene-fluoride resin film of a monolayer configuration was produced. Raw materials and manufacturing conditions are illustrated in Table 1 below.

50% by mass of 1000HD, 30% by mass of K720C, and 20% by mass of MGSS were premixed in an unmelted state, and then further uniformly mixed at a resin temperature of less than 250° C. in the melt-mixing facility described above while adding 10 parts by mass of GM-0449S-2 based on 100 parts by mass of the mixture to give a pellet-like mixture A. The pellet-like mixture A was melted by setting the highest set temperature in a barrel to 240° C. in the extruder A described above and the number of rotations of the screw to 50 RPM, and then extruded into a film shape from the T-die. The extruded film was cooled simultaneously with being taken-up in a take-up portion in which a hard chrome plated roll (Arithmetic average surface roughness Ra=0.2 μm), in which cooling water whose temperature was regulated to 45° C. was circulated, and an embossed rubber roll comprising sand (#600) were press-bonded to each other to give a target film.

The performance of the film obtained by the method described above is illustrated in Table 1 below.

Examples 2 to 4

Also in Examples 2 to 4, vinylidene-fluoride resin films of a monolayer configuration were produced.

Examples 2 to 4 were manufactured in accordance with the same method as in Example 1. Used raw materials, manufacturing conditions, and performance are individually illustrated in Table 1 below.

TABLE 1

| | | | Example 1 | Example 2 | Example 3 | Example 4 |
|---|---|---|---|---|---|---|
| Raw material formulation of vinylidene-fluoride resin film | Compounding formulation of front surface layer | Type of vinylidene-fluoride resin | ①1000HD ②K720 | ①1000HD ②K720 | ①1000HD ②K720 | ①1000HD ②K720 |
| | | Compounding amount [% by mass] | ①50 ②30 | ①50 ②30 | ①50 ②30 | ①50 ②30 |
| | | Type of methacrylic acid ester resin | MGSS | MGSS | MGSS | MGSS |
| | | Compounding amount [% by mass] | 20 | 20 | 20 | 20 |
| | | Type of crosslinked acrylic acid ester resin | GM-0449S-2 | GM-0449S-2 | GM-0449S-2 | GM-0630H |
| | | Average particle diameter [μm] | 4 | 4 | 4 | 6 |
| | | Addition amount [PHR] | 10 | 5 | 25 | 10 |
| Manufacturing conditions of vinylidene-fluoride resin film | Front surface layer | Extruder set temperature in compounding [° C.] | 240 | 240 | 240 | 240 |
| | | Number of rotations of screw in compounding [RPM] | 340 | 340 | 340 | 340 |
| | | Extrusion rate in compounding [kg/h] | 52.6 | 52.6 | 52.6 | 52.6 |
| | | Extruder set temperature in film manufacturing [° C.] | 240 | 240 | 240 | 240 |
| | | Number of rotations of screw in film manufacturing [RPM] | 41 | 41 | 41 | 41 |
| | | Extrusion rate in film manufacturing [kg/h] | 11.6 | 11.6 | 11.6 | 11.6 |
| | Extruder/T-die portion set temperature [° C.] | | 240 | 240 | 240 | 240 |
| | Set temperature of circulating water of first cooling roll, touch roll [° C.] | | 45 | 45 | 45 | 45 |
| | Resin film thickness [μm] | | 30 | 30 | 30 | 30 |
| Performance of vinylidene-fluoride resin film | Front surface layer thickness [μm] | | 30 | 30 | 30 | 30 |
| | Arithmetic average surface roughness Ra in outmost surface of front surface layer [μm] | | 0.89 | 0.6 | 1.20 | 0.89 |
| | Total light transmittance [%] | | 91. 5 | 92.3 | 91.0 | 92.0 |
| | Determination of total light transmittance | | Good | Excellent | Good | Excellent |
| | Total haze [%] | | 87.6 | 80.7 | 93 4 | 84.3 |
| | Internal haze [%] | | 34.4 | 25.8 | 44.6 | 47.7 |
| | Determination of internal haze | | Excellent | Excellent | Good | Acceptable |
| | External haze [%] | | 53.2 | 54.9 | 48.8 | 36.6 |
| | Determination of external haze | | Excellent | Excellent | Good | Acceptable |
| | Determination of transparency | | Excellent | Excellent | Excellent | Good |
| | Glossiness [−] | | 11.0 | 13.0 | 8.0 | 11.5 |
| | Determination of glossiness | | Excellent | Good | Excellent | Excellent |
| | Determination in interior and exterior film use [−] | | Excellent | Good | Excellent | Good |
| | Flexibility of film (followability to irregularities) | | Excellent | Excellent | Excellent | Excellent |

Example 5

In Example 5, a laminated film was produced. Raw materials and manufacturing conditions of a front surface layer and a back surface layer are illustrated in Table 2 below. In Example 5, an ultraviolet absorber was added to the back surface layer.

50% by mass of 1000HD, 30% by mass of K720, and 20% by mass of MGSS were premixed in an unmelted state, and then further uniformly mixed at a resin temperature of less than 250° C. in the melt-mixing facility described above while adding 10 parts by mass of GM-0449S-2 based on 100 parts by mass of the mixture to obtain pellet-like mixture A.

20% by mass of K720 and 80% by mass of HBZG60 were premixed in an unmelted state, and then uniformly mixed at a resin temperature of less than 250° C. in the melt-mixing facility described above to give a pellet-like mixture B.

The pellet-like mixture A was melted by setting the highest set temperature in a barrel to 240° C. in the extruder A and the number of rotations of a screw to 50 RPM. The pellet-like mixture B was melted by setting the highest set temperature in a barrel to 220° C. in the extruder B described above and the number of rotations of a screw to 23 RPM. Each resin was joined and laminated in a feed block, and then extruded into a film shape from the T-die.

The extruded film was cooled simultaneously with being taken-up in a take-up portion in which a hard chrome plated roll (Arithmetic average surface roughness Ra=0.2 μm), in which cooling water whose temperature was regulated to 45° C. was circulated, and an embossed rubber roll comprising sand (#600) were press-bonded to each other to give a target film.

The performance of the film obtained by the method described above is illustrated in Table 2 below.

Examples 6 to 11

Also in Examples 6 to 11, laminated films were produced. Also in Examples 6 to 11, an ultraviolet absorber was added to the back surface layer.

Examples 6 to 11 were manufactured in accordance with the same method as in Example 5. Used raw materials, manufacturing conditions, and performance are individually illustrated in Table 2 below.

TABLE 2

| | | | Example 5 | Example 6 | Example 7 | Example 8 | Example 9 | Example 10 | Example 11 |
|---|---|---|---|---|---|---|---|---|---|
| Raw material formulation of laminated film | Compounding formulation of front surface layer | Type of vinylidene-fluoride resin | ①1000HD ②K720 | ①1000HD ②K720 | ①1000HD ②K720 | ①1000HD ②K720 | 2800.20 | ①1000HD ②K720 | ①1000HD ②K720 |
| | | Compounding amount [% by mass] | ①50 ②30 | ①50 ②30 | ①50 ②30 | ①50 ②30 | 80 | ①50 ②30 | ①50 ②30 |

TABLE 2-continued

| | | | Example 5 | Example 6 | Example 7 | Example 8 | Example 9 | Example 10 | Example 11 |
|---|---|---|---|---|---|---|---|---|---|
| | | Type of methacrylic acid ester resin | MGSS | MGSS | MGSS | MGSS | MGSS | MGSS | MGSS |
| | | Compounding amount [% by mass] | 20 | 20 | 20 | 20 | 20 | 20 | 20 |
| | | Type of crosslinked acrylic acid ester resin | GM-0449S-2 | GM-0449S-2 | GM-0449S-2 | GM-0630H | GM-0449S-2 | GM-0449S-2 | GM-0449S-2 |
| | | Average particle diameter [μm] | 4 | 4 | 4 | 6 | 4 | 4 | 4 |
| | | Addition amount [PHR] | 10 | 5 | 25 | 10 | 10 | 10 | 10 |
| | Compounding formulation of back surface layer | Type of vinylidene-fluoride resin | K720 | K720 | K720 | K720 | K720 | K720 | K720 |
| | | Compounding amount [% by mass] | 20 | 20 | 20 | 20 | 20 | 20 | 20 |
| | | Type of methacrylic acid ester resin | HBS000 | HBS000 | HBS000 | HBS000 | HBS000 | HBS000 | HBS000 |
| | | Compounding amount [% by mass] | 80 | 80 | 80 | 80 | 80 | 80 | 80 |
| | | Type of ultra-violet absorber | Tinovin 1577 ED | Tinovin 1577 ED | Tinovin 1577 ED | Tinovin 1577 ED | Tinovin 1577 ED | Tinovin 1577 ED | Tinovin 234 |
| | | Compounding amount based on 100 parts by mass of resin [parts by mass] | 4.5 | 4.5 | 4.5 | 4.5 | 4.5 | 4.5 | 4.5 |
| Manufacturing conditions of laminated film | Front surface layer | Extruder set temperature in compounding [° C.] | 240 | 240 | 240 | 240 | 240 | 240 | 240 |
| | | Number of rotations of screw in compounding [RPM] | 340 | 340 | 340 | 340 | 340 | 340 | 340 |
| | | Extrusion rate in compounding [kg/h] | 52.6 | 52.6 | 52.6 | 52.6 | 52.6 | 52.6 | 52.6 |
| | | Extruder set temperature in film manufac-turing [° C.] | 240 | 240 | 240 | 240 | 240 | 240 | 240 |
| | | Number of rotations of screw in film manufacturing [RPM] | 23 | 23 | 23 | 23 | 23 | 23 | 23 |
| | | Extrusion rate in film manufac-turing [kg/h] | 6.6 | 6.6 | 6.6 | 6.5 | 6.5 | 6.6 | 6.6 |
| | Back surface layer | Extruder set temperature in compounding [° C.] | 240 | 240 | 240 | 240 | 240 | 240 | 240 |
| | | Number of rotations of screw in com-pounding [RPM] | 340 | 340 | 340 | 340 | 340 | 340 | 340 |
| | | Extrusion rate in compounding [kg/h] | 52.6 | 52.6 | 52.6 | 52.6 | 52.6 | 52.6 | 52.6 |
| | | Extruder set temperature in film manufac-turing [° C.] | 220 | 220 | 220 | 220 | 220 | 220 | 220 |

TABLE 2-continued

| | | | Example 5 | Example 6 | Example 7 | Example 8 | Example 9 | Example 10 | Example 11 |
|---|---|---|---|---|---|---|---|---|---|
| | | Number of rotations of screw in film manufacturing [RPM] | 50 | 50 | 50 | 50 | 50 | 50 | 50 |
| | | Extrusion rate in film manufacturing [kg/h] | 18.7 | 18.7 | 18.7 | 13.4 | 13.4 | 18.7 | 18.7 |
| | Extruder/T-die portion set temperature [° C.] | | 240 | 240 | 240 | 240 | 240 | 240 | 240 |
| | Set temperature of circulating water of first cooling roll, touch roll [° C.] | | 45 | 45 | 45 | 45 | 45 | 45 | 45 |
| | Resin film thickness [μm] | | 50 | 50 | 50 | 50 | 50 | 50 | 50 |
| Performance of laminated film | Front surface layer thickness [μm] | | 17 | 17 | 17 | 17 | 17 | 17 | 17 |
| | Back surface layer thickness [μm] | | 33 | 33 | 33 | 33 | 33 | 33 | 33 |
| | Arithmetic average surface roughness Ra in outmost surface of front surface layer [μm] | | 0.89 | 0.60 | 1.20 | 0.79 | 0.82 | 0.89 | 0.89 |
| | Total light transmittance [%] | | 91.8 | 92.5 | 91.2 | 92.1 | 91.2 | 91.8 | 91.8 |
| | Determination of total light transmittance | | Good | Excellent | Good | Excellent | Good | Good | Good |
| | Total haze [%] | | 81.5 | 76.7 | 88.9 | 76.5 | 80.2 | 81.5 | 81.5 |
| | Internal haze [%] | | 30.1 | 22.5 | 39.6 | 45.8 | 25.4 | 30.1 | 30.1 |
| | Determination of internal haze | | Excellent | Excellent | Good | Acceptable | Excellent | Excellent | Excellent |
| | External haze [%] | | 51.4 | 54.2 | 49.3 | 31.2 | 54.8 | 51.4 | 51.4 |
| | Determination of external haze | | Excellent | Excellent | Good | Acceptable | Excellent | Excellent | Excellent |
| | Determination of transparency | | Excellent | Excellent | Excellent | Good | Excellent | Excellent | Excellent |
| | Glossiness [−] | | 11.0 | 13.0 | 8.0 | 13.0 | 11.0 | 11.0 | 11.0 |
| | Determination of glossiness | | Excellent | Good | Excellent | Good | Excellent | Excellent | Excellent |
| | Determination in interior and exterior film use [−] | | Excellent | Good | Excellent | | Excellent | Excellent | Excellent |
| | Flexibility of film (followability to irregularities) | | Good | Good | Good | Good | Excellent | Good | Good |

Examples 12 and 13

Also in Examples 12 and 13, laminated films were produced. In Examples 12 and 13, an ultraviolet absorber was not added to the back surface layer.

Examples 12 and 13 were manufactured in accordance with the same method as in Example 5. Used raw materials, manufacturing conditions, and performance are individually illustrated in Table 3 below.

TABLE 3

| | | | Example 12 | Example 13 |
|---|---|---|---|---|
| Raw material formulation of laminated film | Compounding formulation of front surface layer | Type of vinylidene-fluoride resin | ①1000HD ②K720 | ①1000HD ②K720 |
| | | Compounding amount [% by mass] | ①50 ②30 | ①50 ②30 |
| | | Type of methacrylic acid ester resin | MGSS | MGSS |
| | | Compounding amount [% by mass] | 20 | 20 |
| | | Type of crosslinked acrylic acid ester resin | GM-0449S-2 | GM-0449S-2 |
| | | Average particle diameter [μm] | 4 | 4 |
| | | Addition amount [PHR] | 10 | 10 |
| | Compounding formulation of back surface layer | Type of vinylidene-fluoride resin | K720 | K720 |
| | | Compounding amount [% by mass] | 20 | 20 |
| | | Type of methacrylic acid ester resin | HBS000 | HBZG60 |
| | | Compounding amount [% by mass] | 80 | 80 |
| | | Type of ultraviolet absorber | — | — |
| | | Compounding amount based on 100 parts by mass of resin [parts by mass] | — | — |
| Manufacturing conditions of laminated film | Front surface layer | Extruder/resin set temperature in compounding [° C.] | 240 | 240 |
| | | Number of rotations of screw in compounding [RPM] | 340 | 340 |
| | | Extrusion rate in compounding [kg/h] | 52.6 | 52.6 |
| | | Extruder/resin set temperature in film manufacturing [° C.] | 240 | 240 |
| | | Number of rotations of screw in film manufactunug [RPM] | 23 | 23 |
| | | Extrusion rate in film manufacturing [kg/h] | 6.6 | 6.6 |
| | Back surface layer | Extruder set temperature in compounding [° C.] | 240 | 240 |
| | | Number of rotations of screw in compounding [RPM] | 340 | 340 |
| | | Extrusion rate in compounding [kg/h] | 52.6 | 52.6 |

TABLE 3-continued

| | | Example 12 | Example 13 |
|---|---|---|---|
| | Extruder set temperature in film manufacturing [° C.] | 220 | 220 |
| | Number of rotations of screw in film manufacturing [RPM] | 50 | 50 |
| | Extrusion rate in film manufacturing [kg/h] | 13.7 | 13.7 |
| | Extruder/T-die portion set temperature [° C.] | 240 | 240 |
| | Set temperature of circulating water of first cooling roll, touch roll [° C.] | 45 | 45 |
| | Resin film thickness [μm] | 50 | 50 |
| Performance of laminated film | Front surface layer thickness [μm] | 17 | 17 |
| | Back surface layer thickness [μm] | 33 | 33 |
| | Arithmetic average surface roughness Ra in outmost surface of front surface layer [μm] | 0.89 | 0.86 |
| | Total light transmittance [%] | 91.8 | 91.8 |
| | Determination of total light transmittance | Good | Good |
| | Total haze [%] | 81.5 | 81.5 |
| | Internal haze [%] | 80.1 | 80.1 |
| | Determination of internal haze | Excellent | Excellent |
| | External haze [%] | 51.4 | 51.4 |
| | Determination of external haze | Excellent | Excellent |
| | Determination of transparency | Excellent | Excellent |
| | Glossiness[·] | 11.0 | 11.0 |
| | Determination of glossiness | Excellent | Excellent |
| | Determination in interior and exterior film use [·] | Excellent | Excellent |
| | Flexibility of film (followability to irregularities) | Good | Good |

Comparative Examples 1 to 9

Comparative Examples 1 to 9 were manufactured in accordance with the same method as in Example 5. In Comparative Examples 1 to 9, an ultraviolet absorber was added to the back surface layer.

Used raw materials, manufacturing conditions, and performance are individually illustrated in Table 4 below.

TABLE 4

| | | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| Raw material formulation of surface protective film | Compounding formulation of front surface layer | Type of vinylidene-fluoride resin | ①1000HD ②K720 | ①1000HD ②K720 | ①1000HD ②K720 | ①1000HD ②K720 | ①1000HD ②K720 | ①1000HD ②K720 | ①1000HD ②K720 | ①1000HD ②K720 | ①1000HD ②K720 |
| | | Compounding amount [% by mass] | ①50 ②30 | ①50 ②30 | ①50 ②30 | ①50 ②30 | ①50 ②30 | ①50 ②30 | ①50 ②30 | ①50 ②30 | ①50 ②30 |
| | | Type of methacrylic acid ester resin | MGSS | MGSS | MGSS | MGSS | MGSS | MGSS | MGSS | MGSS | MGSS |
| | | Compounding amount [% by mass] | 20 | 20 | 20 | 20 | 20 | 20 | 20 | 20 | 20 |
| | | Type of crosslinked acrylic acid ester resin | GM-0808S | GM-0808S | GM-0808S | GM-1001 | GM-08S | GBM-556-F | GM-0105 | GM-205S | Si-045 |
| | | Average particle diameter [μm] | 8 | 8 | 8 | 10 | 8 | 8 | 2 | 3 | 4.5 |
| | | Addition amount [PHR] | 5 | 10 | 15 | 10 | 10 | 10 | 20 | 10 | 10 |
| | Compounding formulation of back surface layer | Type of vinylidene-fluoride resin | K720 | K720 | K720 | K720 | K720 | K720 | K720 | K720 | K720 |
| | | Compounding amount [% by mass] | 20 | 20 | 20 | 20 | 20 | 20 | 20 | 20 | 20 |
| | | Type of methacrylic acid ester resin | HBS000 | HBS000 | HBS000 | HBS000 | HBS000 | HBS000 | HBS000 | HBS000 | HBS000 |
| | | Compounding amount [% by mass] | 80 | 80 | 80 | 80 | 80 | 80 | 80 | 80 | 80 |

TABLE 4-continued

| | | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| | | Type of ultraviolet absorber | 1577 ED | 1577 ED | 1577 ED | 1577 ED | 1577 ED | 1577 ED | 1577 ED | 1577 ED | 1577 ED |
| | | Compounding amount based on 100 parts by mass of resin [parts by mass] | 2.5 | 4.0 | 5.5 | 4.5 | 4.0 | 4.5 | 4.5 | 5.5 | 6.7 |
| Manufacturing conditions of surface protective film | Front surface layer | Extruder set temperature in compounding [° C.] | 234 | 235 | 234 | 235 | 234 | 235 | 235 | 234 | 235 |
| | | Number of rotations of screw in compounding [RPM] | 340 | 340 | 340 | 340 | 340 | 340 | 340 | 340 | 340 |
| | | Extrusion rate in compounding [kg/h] | 52.6 | 52.6 | 52.6 | 52.6 | 52.6 | 52.6 | 52.6 | 52.6 | 52.6 |
| | | Extruder set temperature in film manufacturing [° C.] | 235 | 236 | 235 | 235 | 235 | 236 | 236 | 235 | 236 |
| | | Number of rotations of screw in film manufacturing [RPM] | 18.4 | 23 | 23 | 23 | 23 | 23 | 23 | 23 | 23 |
| | | Extrusion rate in film manufacturing [kg/h] | 4.2 | 6.6 | 6.5 | 6.5 | 6.6 | 6.6 | 6.5 | 6.6 | 6.5 |
| | Back surface layer | Extruder set temperature in compounding [° C.] | 240 | 240 | 240 | 240 | 240 | 240 | 240 | 240 | 240 |
| | | Number of rotations of screw in compounding [RPM] | 340 | 340 | 340 | 340 | 340 | 340 | 340 | 340 | 340 |
| | | Extrusion rate in compounding [kg/h] | 52.6 | 52.6 | 52.6 | 52.6 | 52.6 | 52.6 | 52.6 | 52.6 | 52.6 |
| | | Extruder set temperature in film manufacturing [° C.] | 220 | 220 | 220 | 220 | 220 | 220 | 220 | 220 | 220 |
| | | Number of rotations of screw in film manufacturing [RPM] | 40 | 50 | 50 | 50 | 50 | 50 | 50 | 50 | 50 |
| | | Extrusion rate in film manufacturing [kg/h] | 11.0 | 13.6 | 13.9 | 13.7 | 13.9 | 13.3 | 13.8 | 13.6 | 14.0 |
| | Extruder/T-die portion set temperature [° C.] | | 240 | 240 | 240 | 240 | 240 | 240 | 240 | 240 | 240 |
| | Set temperature of circulating water of first cooling roll, touch roll [° C.] | | 45 | 45 | 45 | 45 | 45 | 45 | 45 | 45 | 45 |
| | Resin film thickness [μm] | | 40 | 50 | 50 | 50 | 50 | 50 | 50 | 50 | 50 |

TABLE 4-continued

| | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Performance of surface protective film | Front surface layer thickness [μm] | 14 | 17 | 17 | 17 | 17 | 17 | 17 | 17 | 17 |
| | Back surface layer thickness [μm] | 26 | 33 | 33 | 33 | 33 | 33 | 33 | 33 | 33 |
| | Arithmetic average surface roughness Ra in outmost surface of front surface layer [μm] | 0.62 | 0.72 | 0.99 | 0.80 | 0.63 | 0.48 | 0.31 | 0.43 | 0.36 |
| | Total light transmittance [%] | 92.3 | 91.9 | 90.9 | 91.8 | 91.5 | 92.0 | 93.3 | 91.9 | 90.9 |
| | Determination of total light transmittance | Excellent | Good | Acceptable | Good | Good | Excellent | Excellent | Good | Acceptable |
| | Total haze [%] | 63.2 | 77.6 | 89.7 | 77.9 | 82.2 | 73.4 | 62.6 | 90.1 | 80.3 |
| | Internal haze [%] | 38.4 | 53.2 | 57.3 | 48.7 | 64.7 | 65.3 | 61.0 | 67.1 | 52.4 |
| | Determination of internal haze | Good | Acceptable | Poor | Acceptable | Poor | Poor | Poor | Poor | Acceptable |
| | External haze [%] | 24.8 | 24.4 | 22.4 | 29.2 | 17.5 | 8.1 | 20.7 | 23.0 | 27.9 |
| | Determination of external haze | Poor | Poor | Poor | Poor | Poor | Poor | Poor | Poor | Poor |
| | Determination of transparency | Poor | Poor | Poor | Poor | Poor | Poor | Poor | Poor | Poor |
| | Glossiness [−] | 18 | 16 | 11 | 11 | 14 | 18 | 12 | 20 | 25 |
| | Determination of glossiness | Poor | Poor | Excellent | Excellent | Acceptable | Poor | Good | Poor | Poor |
| | Determination in interior and exterior film use [−] | Poor | Poor | Poor | Poor | Poor | Poor | Poor | Poor | Poor |
| | Flexibility of film (followability to irregularities) | Good | Good | Good | Good | Good | Good | Good | Good | Good |

The evaluation of the physical properties and the performance illustrated in Tables 1 to 4 were performed by the following methods.

<Measurement of Average Particle Diameter of Crosslinked Acrylic Acid Ester Resin Particles>

The average particle diameter of the crosslinked acrylic acid ester resin particles was measured as follows.

The film was placed and fixed in a small metal vise, and then cut using a single-edge knife so that the cross section of the film was smooth. In the state where the film was placed in the vise, the film cross section was observed at a magnification of 50 times using a confocal laser microscope (VK-X110 manufactured by KEYENCE CORR), and then the maximum diameter of crosslinked resin beads present in the area of "Crosslinked resin bead added layer thickness (m)×100 μm" in the cross section of the layer was measured. This operation was repeated 30 times, the arithmetic average value of the maximum diameters was calculated, and then the value was set as the average particle diameter.

With respect to the arithmetic average roughness (Ra) of the vinylidene-fluoride resin film, the film front surface was observed at a magnification of 50 times using a confocal laser microscope (VK-X110 manufactured by KEYENCE CORP.), the arithmetic average roughness Ra was measured in the range of the length of 250 μm, and then an average value of values at different three places was set as the arithmetic average roughness Ra of the film.

<Evaluation of Transparency (Haze) of Resin Film>

With respect to the transparency of the resin film, the total light transmittance and the total haze value were evaluated using a Haze Meter "NDH7000" manufactured by Nippon Denshoku Industries Co., LTD.

In the evaluation, test pieces cut out from arbitrary five places in the TD direction of the resin film were used, and the arithmetic average value thereof was adopted.

The internal haze was measured by applying a liquid paraffin to both surfaces of the film, sandwiching the same with 0.15 mm thick cover glasses so that air bubbles did not enter, and then measured with the same meter.

The external haze was obtained by calculating a difference between the total haze value and the internal haze obtained by performing the measurement in accordance with the method described above. With respect to each physical property value, the performance was determined in accordance with the following determination standards.

<<Total Light Transmittance>>

Excellent: 92% or more

Good: 91% or more and less than 92%

Acceptable: 90% or more and less than 91%

Poor: Less than 90%

<<Internal Haze>>

Excellent: Less than 35%

Good: 35% or more and less than 45%

Acceptable: 45% or more and less than 55%

Poor: 55% or more

<<External Haze>>

Excellent: 50% or more

Good: 40% or more and less than 50%

Acceptable: 30% or more and less than 40%

Poor: Less than 30%

<<Determination of Transparency>>

Excellent: The total light transmittance, the internal haze, and the external haze are either Excellent or Good.

Good: The total light transmittance, the internal haze, and the external haze include Excellent, Good, and Acceptable.

Acceptable: The total light transmittance, the internal haze, and the external haze are either Good or Acceptable.

Poor: The total light transmittance, the internal haze, and the external haze include one or more Poor.

<Glossiness of Resin Film>

With respect to the glossiness of the resin film, a gloss value at an incident angle of a light beam of 60° was measured according to JIS K 5600-4-7 using a Handy type gloss meter PG-IIM manufactured by Nippon Denshoku Industries Co., LTD., and then the arithmetic average value of three measured values was adopted.

Excellent: Gloss value pf less than 12

Good: Gloss value of 12 or more and less than 14

Acceptable: Gloss value of 14 or more and less than 15

Poor: Gloss value of 15 or more

<Determination of Performance as Interior and Exterior Film>

Excellent: Both the determination of the transparency and the determination of the glossiness are Excellent.

Good: One of the determination of the transparency and the determination of glossiness is Excellent and the other one is Good or Acceptable.

Acceptable: Both the determination of the transparency and the determination of glossiness are Good or Acceptable.

Poor: The determination of the transparency and the determination of glossiness include Poor.

<Flexibility of Film (Followability to Irregularities)>

The flexibility of the resin film was evaluated as follows.

The film was cut into a 21.5 mm wide strip shape, and then the same surfaces of both ends were stuck to each other with a tape to form a ring 22.3 mm in diameter. The ring was pressed in the horizontal direction to be deformed into an oval shape, and then the flexibility of the film was evaluated as follows from a load in the horizontal direction when the minor axis of the oval reached 12.3 mm.

Excellent: Less than 0.6 gf

Good: 0.6 gf or more and less than 0.8 gf

Acceptable: 0.8 gf or more and less than 1.0 gf

Poor: 1.0 gf or more

<Ultraviolet-Ray Cutting Performance>

The ultraviolet-ray cutting performance of the resin film was evaluated as follows.

With respect to the resin film, an accelerated weatherability test was performed using a metal weather manufactured by DAIPLA WINTES CO., LTD. under the conditions of irradiation illuminance of 132 mW/cm$^2$, a black panel temperature of 63° C., a humidity Rh of 50%, and an irradiation/spraying cycle of 6 hours/2 hours, spectrophotometric measurement was performed for the resin film after a test time of 576 hours, and then the ultraviolet-ray cutting performance was evaluated from the transmittance of ultraviolet rays with a wavelength of 280 nm.

Excellent: Less than 1%

Good: 1% or more and less than 10%

Acceptable: 10% or more and less than 20%

Poor: 20% or more

The results of Table 1 and Table 2 show that, while the vinylidene-fluoride resin film and the laminated film of the present invention are excellent in lowness of glossy, the vinylidene-fluoride resin film and the laminated film of the present invention have a low internal haze value and are hard to impair the visibility of a design of a decorative film.

INDUSTRIAL APPLICABILITY

The vinylidene-fluoride resin film and the laminated film of the present invention are suitable for the application as car interiors, such as an installment panel, a dashboard, and a door, and car exteriors, such as a body, a front bumper, and a rear bumper. Moreover, the vinylidene-fluoride resin film and the laminated film of the present invention are also usable for an inner and exterior film of infrastructures and various buildings, an interior and exterior film of an automobile, a railway vehicle, an airplane, a watercraft, and a spacecraft, a surface protective film of water section facilities, such as a kitchen and a bathroom, and the like.

REFERENCE SIGNS LIST

1. Vinylidene-fluoride Resin
2. Crosslinked acrylic acid ester resin particle
3. Vinylidene-fluoride resin film
4. Matte tone surface
5. Back surface layer
6. Decorative film

The invention claimed is:

1. A vinylidene-fluoride resin film comprising:

a vinylidene-fluoride resin; and crosslinked acrylic acid ester resin particles, wherein the crosslinked acrylic acid ester resin particles have an average particle diameter of 5% or more and 40% or less to a thickness of the vinylidene-fluoride resin film, an arithmetic average surface roughness (Ra) of the vinylidene-fluoride resin film is 0.4 μm or more and less than 2 μm;

50 parts by mass or more and 99 parts by mass or less of the vinylidene fluoride resin comprising a copolymer of vinylidene fluoride and hexafluoropropene and/or polyvinylidene fluoride; and 50 parts by mass or less and 1 part by mass or more of a methacrylic acid ester resin so that a total is 100 parts by mass;

a total light transmittance of the vinylidene-fluoride resin film of 90% or greater;

a total haze of vinylidene-fluoride resin film of 60% or more;

an internal haze of the vinylidene-fluoride resin film of less than 55%;

an external haze of the vinylidene-fluoride resin film of 30% or more; and a glossiness of the vinylidene-fluoride resin film of less than 15, wherein the average particle diameter of the crosslinked acrylic acid ester resin particles is 3.5 μm or more and 4.5 μm or less.

2. The vinylidene-fluoride resin film according to claim 1, wherein the crosslinked acrylic acid ester resin particles are comprised in an amount of 5 parts by mass or more and 25 parts by mass or less based on 100 parts by mass of a vinylidene-fluoride resin.

3. The vinylidene-fluoride resin film according to claim 1, wherein the thickness of the vinylidene-fluoride resin film is 5 μm or more and 200 μm or less.

4. A laminated film, in which the vinylidene-fluoride resin film according to claim 1 is laminated on a methacrylic acid ester resin film comprising a methacrylic acid ester resin.

5. The laminated film according to claim 4, wherein the methacrylic acid ester resin comprises a vinylidene-fluoride resin.

6. The laminated film according to claim 4, the methacrylic acid ester resin further comprising:

50 parts by mass or less and 1 part by mass or more of the vinylidene fluoride resin comprising a copolymer of vinylidene fluoride and hexafluoropropene and/or polyvinylidene fluoride; and 50 parts by mass or more and 99 parts by mass or less of the methacrylic acid ester resin so that the total is 100 parts by mass.

7. The laminated film according to claim 4, wherein an entire thickness of the laminated film is 20 μm or more and 300 μm or less, and a ratio of the methacrylic acid ester resin film to the entire thickness of the film is 95% or less.

8. The laminated film according to claim 4, configured to be laminated on a decorative film.

9. An automobile part, to a front surface of which the vinylidene-fluoride resin film according to claim 1 is bonded.

10. An automobile part, to a front surface of which the laminated film according to claim 4 is bonded.

11. An automobile, to a front surface of which the vinylidene-fluoride resin film according to claim 1 is bonded.

12. An automobile, to a front surface of which the laminated film according to claim 4 is bonded.

* * * * *